US011822014B2

(12) United States Patent
Dutton et al.

(10) Patent No.: US 11,822,014 B2
(45) Date of Patent: Nov. 21, 2023

(54) APPARATUS AND METHOD FOR CONTROLLING SYSTEM TIMING WITHIN A LIDAR SYSTEM

(71) Applicant: STMicroelectronics (Research & Development) Limited, Buckinghamshire (GB)

(72) Inventors: Neale Dutton, Edinburgh (GB); Sarrah Moiz Patanwala, Edinburgh (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 858 days.

(21) Appl. No.: 16/694,386

(22) Filed: Nov. 25, 2019

(65) Prior Publication Data

US 2020/0166612 A1 May 28, 2020

(30) Foreign Application Priority Data

Nov. 27, 2018 (EP) .................................. 18208689

(51) Int. Cl.
*G01S 7/48* (2006.01)
*G01S 7/484* (2006.01)
*G01S 7/481* (2006.01)
*G01S 7/487* (2006.01)
*G01S 17/10* (2020.01)

(52) U.S. Cl.
CPC .............. *G01S 7/484* (2013.01); *G01S 7/487* (2013.01); *G01S 7/4815* (2013.01); *G01S 17/10* (2013.01)

(58) Field of Classification Search
USPC ........................................................ 356/5.01
See application file for complete search history.

(56) References Cited

U.S. PATENT DOCUMENTS

| 5,206,697 A | 4/1993 | Schwartz | |
|---|---|---|---|
| 7,944,548 B2* | 5/2011 | Eaton | G01C 11/025 356/5.07 |
| 8,432,304 B2* | 4/2013 | Dutton | G04F 10/005 341/94 |
| 9,091,754 B2* | 7/2015 | d'Aligny | G01S 7/484 |
| 2005/0122593 A1* | 6/2005 | Johnson | G03F 7/70575 359/650 |
| 2006/0238742 A1 | 10/2006 | Hunt et al. | |

(Continued)

FOREIGN PATENT DOCUMENTS

| EP | 3217190 A1 | 9/2017 |
| WO | 2018176115 A1 | 10/2018 |

OTHER PUBLICATIONS

European Search Opinion for EP10208689 (Year: 2019).*

*Primary Examiner* — James R Hulka
(74) *Attorney, Agent, or Firm* — Slater Matsil, LLP

(57) ABSTRACT

A method can be used for controlling pixel scanning within a range detector. A spatially controllable point light source generates a first series of light source pulses associated with a first spatial direction. The first series of light source pulses are generated during a first time period. The spatially controllable point light source generates a second series of light source pulses associated with a second spatial direction. The second series of light source pulses are generated during a second time period that overlaps with the first time period so that the second series of light source pulses are started during the first series of light source pulses.

23 Claims, 13 Drawing Sheets

(56) References Cited

U.S. PATENT DOCUMENTS

| | | | |
|---|---|---|---|
| 2008/0032066 A1* | 2/2008 | Stiblert | G03F 7/704 |
| | | | 29/559 |
| 2009/0122295 A1 | 5/2009 | Eaton | |
| 2011/0222074 A1* | 9/2011 | Svensson | G03F 9/7019 |
| | | | 356/620 |
| 2012/0154187 A1* | 6/2012 | Dutton | H03M 7/165 |
| | | | 341/118 |
| 2013/0050676 A1 | 2/2013 | d'Aligny | |
| 2014/0084050 A1* | 3/2014 | Calvarese | G01C 21/206 |
| | | | 235/375 |
| 2014/0231679 A1* | 8/2014 | Kremeyer | G21K 1/08 |
| | | | 378/145 |
| 2016/0003946 A1* | 1/2016 | Gilliland | G01S 7/4816 |
| | | | 356/5.01 |
| 2017/0075206 A1* | 3/2017 | McAndrew | G03B 21/567 |
| 2017/0095155 A1* | 4/2017 | Nakajima | A61B 5/14552 |
| 2018/0081038 A1* | 3/2018 | Medina | G01S 7/4817 |
| 2020/0166751 A1* | 5/2020 | Gotoh | B60K 35/00 |

* cited by examiner

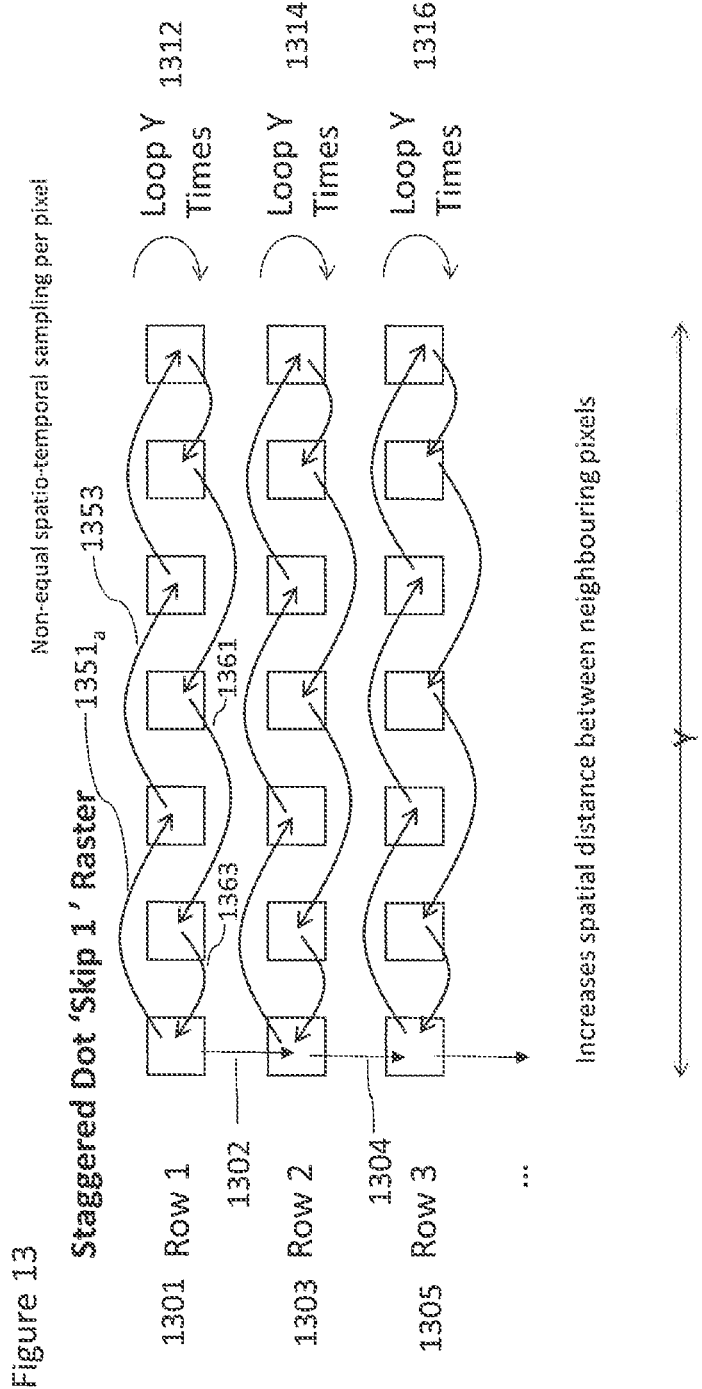

APPARATUS AND METHOD FOR CONTROLLING SYSTEM TIMING WITHIN A LIDAR SYSTEM

CROSS-REFERENCE TO RELATED APPLICATIONS

This application claims priority to European Patent Application No. 18208689.2, filed on Nov. 27, 2018, which application is hereby incorporated herein by reference.

TECHNICAL FIELD

Embodiments relate to a method and apparatus for controlling the system timing within a LIDAR system.

BACKGROUND

Range and distance detection using light is known. These systems can be known as LIDAR (light detection and ranging) have many applications including consumer electronics, automotive, robotics, surveying and so on.

An example LIDAR system uses a light source, for example a vertical cavity surface emitting laser (VCSEL), to generate light pulses which are reflected from a surface and then detected at a receiver or detector, for example a photodiode or single photon avalanche diode (SPAD) array.

The time difference between the light being transmitted and received provides the distance or range value using the simple equation D=S*T, where T is the time difference, S the speed of light and D the distance from the transmitter to the reflecting object and back again.

A single photon avalanche diodes (SPAD) is a semiconductor devices capable of detecting light. A photon impinging on a detection region of a SPAD generates an electron and hole pair via the photoelectric effect. The SPAD is reverse-biased with a high voltage magnitude such that when the electron/hole carriers are generated, the electric field applied across the detection region causes the carriers to be accelerated to a relatively high velocity according to the strength and direction of the applied field. If the kinetic energy of the accelerated carriers is sufficient, additional carriers will be generated from the semiconductor lattice, which are in turn accelerated by the field, and may liberate further carriers in an exponentially increasing fashion. Thus, when a sufficiently high electric field is applied across the detection region, a single impinging photon may generate an avalanche of carriers, resulting in an output current 'pulse', where the current output is proportional to the number of photons detected.

The minimum voltage required to cause an avalanche of carriers, and thus allow the device to operate as a SPAD, is known as the breakdown voltage. If the voltage applied is too low, i.e. below the breakdown voltage, then the device does not produce any output. However if the voltage applied is too high, then it is possible that the electric field generated may be sufficient to cause a carrier avalanche even when there are no photons impinging on the SPAD, resulting in a false output current. This false output is known as a "dark current".

SUMMARY

Embodiments relate to a method and apparatus for controlling the system timing within a LIDAR system. Particular embodiments relate to a method and apparatus for controlling the system timing within a LIDAR system comprising single photon avalanche diodes as receiver diodes.

According to first aspect an apparatus for controlling pixel scanning within a range detector comprises at least one light source configured to provide a spatially controllable point light source. A detector comprising at least one light sensor is configured to receive a reflected spatially controllable point light source. A controller is configured to control the at least one light source. The controller is configured to control the at least one light source to generate a first series of light source pulses, associated with a first spatial direction and control the at least one light source to generate a second series of light source pulses associated with a second spatial direction. The second series of light source pulses are started during the first series of light source pulses.

The controller may be configured to start the second series of light source pulses a determined time period after the start of the first series of light source pulses, wherein the determined time period may be shorter than a time period of the first series of light source pulses.

The first series of light pulses may be associated with a first row of light sensor elements and the second series of light pulses are associated with a second row of light sensor elements.

The first series of light pulses may be associated with a first row first light sensor element of the first row of light sensor elements and the second series of light pulses may be associated with a second row first light sensor element of the second row of light sensor elements.

The controller may be further configured to: control the at least one light source to generate a third series of light source pulses, associated with a third spatial direction, the third spatial direction may be associated with a third row of light sensor elements, wherein the third series of light source pulses may be substantially simultaneously operated with the first series of light source pulses.

The controller may be further configured to control the at least one light source to at least one of spatially dither the at least one light source and randomly select a spatial direction during at least one of the first and second series of light pulses.

The controller may be further configured to control the at least one light source to form at least one of a z-raster pattern with the at least one light source; a snake-raster pattern with the at least one light source; a x-raster pattern with the at least one light source; a random or pseudo-random pattern with the at least one light source; and a skip-n raster pattern with the at least one light source.

According to a second aspect a method for controlling pixel scanning within a range detector comprises providing a spatially controllable point light source and controlling the spatially controllable point light source. Controlling the spatially controllable light source comprises generating a first series of light source pulses associated with a first spatial direction and generating a second series of light source pulses associated with a second spatial direction. The second series of light source pulses are started during the first series of light source pulses.

Generating a second series of light source pulses associated with a second spatial direction may comprise starting the second series of light source pulses a determined time period after the start of the first series of light source pulses, wherein the determined time period may be shorter than a time period of the first series of light source pulses.

The method may further comprise: receiving a reflected spatially controllable point light source at a detector comprising at least one light sensor, wherein the first series of light pulses may be received by a first row of elements of the light sensor and the second series of light pulses may be received by a second row of elements of the light sensor.

The first series of light pulses may be received by a first row first element of the light sensor and the second series of light pulses may be associated with a second row first element of the light sensor.

Controlling the spatially controllable light source may comprise further generating a third series of light source pulses, associated with a third spatial direction, wherein the third series of light source pulses may be substantially simultaneously operated with the first series of light source pulses, wherein the third series of light pulses may be received by a third row of elements of the light sensor.

Controlling the spatially controllable point light source may perform at least one of: spatially dithering the at least one light source; and randomly selecting a spatial direction during at least one of the first and second series of light pulses.

Controlling the spatially controllable point light source may comprise controlling the at least one light source to form at least one of: a z-raster pattern with the at least one light source; a snake-raster pattern with the at least one light source; a x-raster pattern with the at least one light source; a random or pseudo-random pattern with the at least one light source; and a skip n raster pattern with the at least one light source.

According to a third aspect there is provided an apparatus for controlling pixel scanning within a range detector, the apparatus comprising: means for providing a spatially controllable point light source; and means for controlling the spatially controllable point light source, wherein the means for controlling the spatially controllable light source comprises: means for generating a first series of light source pulses, associated with a first spatial direction; means for generating a second series of light source pulses associated with a second spatial direction, wherein the second series of light source pulses are started during the first series of light source pulses.

The means for generating a second series of light source pulses associated with a second spatial direction may comprise means for starting the second series of light source pulses a determined time period after the start of the first series of light source pulses, wherein the determined time period may be shorter than a time period of the first series of light source pulses.

The apparatus may further comprise: means for receiving a reflected spatially controllable point light source at a detector comprising at least one light sensor, wherein the first series of light pulses may be received by a first row of elements of the light sensor and the second series of light pulses may be received by a second row of elements of the light sensor.

The first series of light pulses may be received by a first row first element of the light sensor and the second series of light pulses may be associated with a second row first element of the light sensor.

The means for controlling the spatially controllable light source may further comprise means for generating a third series of light source pulses, associated with a third spatial direction, wherein the third series of light source pulses may be substantially simultaneously operated with the first series of light source pulses, wherein the third series of light pulses may be received by a third row of elements of the light sensor.

The means for controlling the spatially controllable point light source may perform at least one of: spatially dithering the at least one light source; and randomly selecting a spatial direction during at least one of the first and second series of light pulses.

The means for controlling the spatially controllable point light source may comprise means for controlling the at least one light source to form at least one of: a z-raster pattern with the at least one light source; a snake-raster pattern with the at least one light source; a x-raster pattern with the at least one light source; a random or pseudo-random pattern with the at least one light source; and a skip n raster pattern with the at least one light source.

BRIEF DESCRIPTION OF THE DRAWINGS

FIGS. 11 to 13 show an example staggered raster patterns for reading SPADs based on the timing diagrams of FIGS. 5 to 8 according to some embodiments.

DETAILED DESCRIPTION OF ILLUSTRATIVE EMBODIMENTS

The concept as described in further detail according to some embodiments is the provision of an improved performance LIDAR system by defining a staggered dot or blade timing configuration controlling the transmitter and receiver. The concept as discussed in further detail involves at least partially overlapping detector timing ranges.

Figure 1:
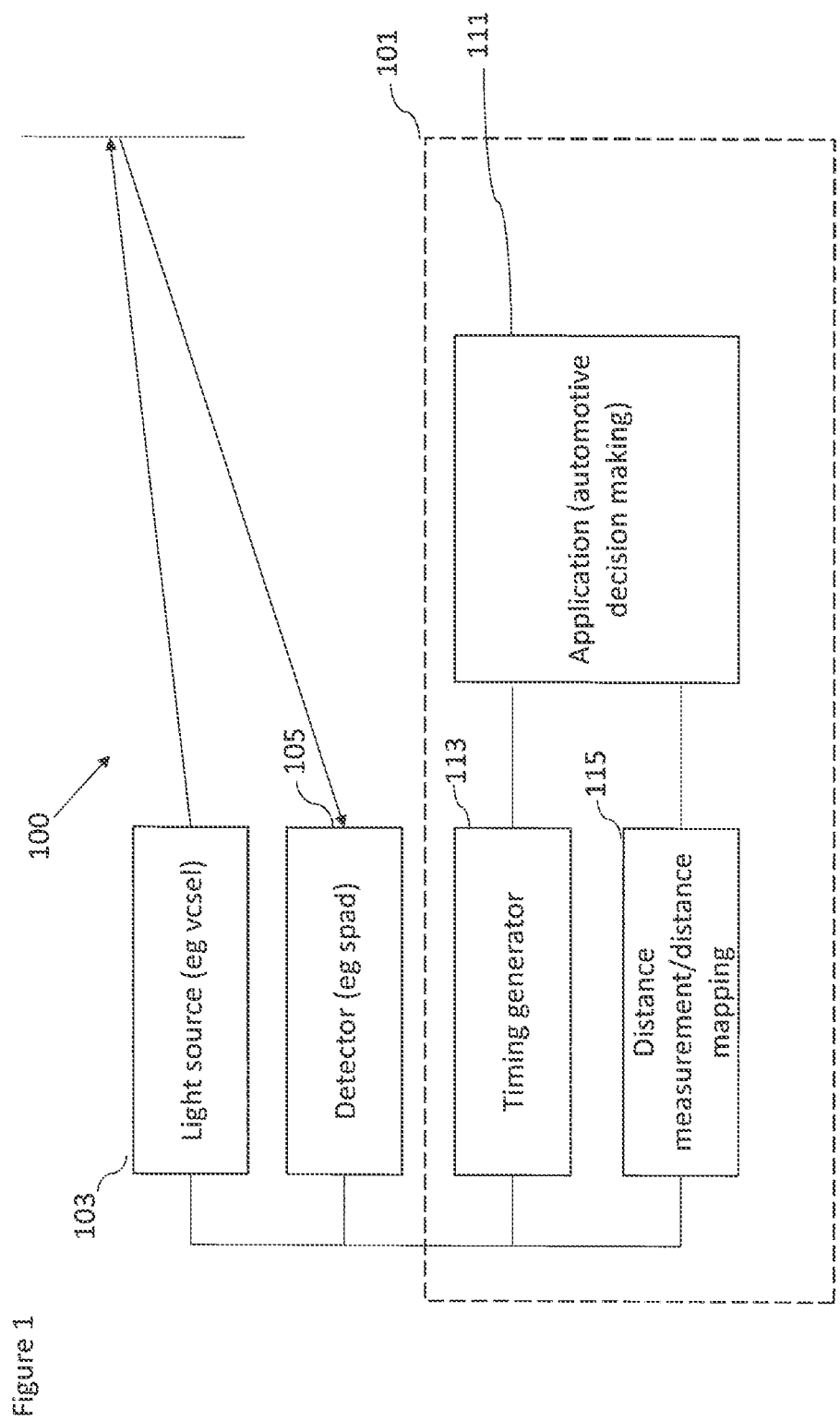
FIG. 1 shows schematically an example LIDAR system within which embodiments may be implemented according to some embodiments.

With respect to FIG. 1 an example range or distance measurement system suitable for implementing some embodiments is shown in further detail. The system 100 comprises a light source 103. The light source may be considered to be a transmitter of the light used in the distance detection. The light source may be any suitable pulse (or wave) light source. For example in some embodiments the light source may be one or more vertical cavity surface emitting laser light sources. A vertical cavity surface emitting laser is suitable as it is able to produce well defined pulses of suitable short duration. The light source 103 may further comprise or be coupled to various optics configured to collimate and/or focus the light source to a specific region or area. Furthermore in some embodiments the light source comprises a mechanical or optical beam director configured to direct the light according to a defined pattern towards a target or surface 104. The emitted light 102 may then be incident on the surface 104 and reflected light 106 be received at the detector 105.

The system 100 may comprise a detector 105, which may comprise or be coupled to various optics configured to focus the returning light to a specific photosensitive region or area within the detector. The detector may be considered to be a receiver of the light used in the distance detection. Furthermore in some embodiments the detector comprises or is associated with a mechanical or optical beam director (which in some embodiments is the same one as used by the light source 103) configured to direct the returning light according towards a specific photosensitive region or area within the detector. In some embodiments the detector 105 comprises a photosensitive region, for example an array of single photon avalanche diodes configured to convert the received light into electronic signals suitable for outputting.

Furthermore the system may comprise a timing generator (or controller) 113. In some embodiments the detector 105 and light source 103 may be controlled using a timing generator 113. The timing generator 113 can be configured to generate various timing or control pulses to control the light source, for example to control when and where the light is to be transmitted. The timing generator 113 may further be configured to further control the detector, to activate some regions as being photosensitive or active and some other regions as being inactive.

Furthermore the system may comprise a distance measurement/distance mapping unit 115. The distance measurement/mapping unit 115 can in some embodiments be configured to receive timing control information from the timing generator 113 and from the detector 105 (and in some embodiments the light source 103) and determine the distance between the system 100 and the surface 102 based on the time taken for the light to travel from the light source 103 to the surface 104 and from the surface 104 to the detector 106. The distance measurement/mapping unit 115 may for example be configured to generate a histogram of detected events (against time) and from the histogram determine a distance. In some embodiments the distance measurement/distance mapping unit 115 is configured to determine distances for more than one point or area and therefore determine a distance map.

In some embodiments the system 100 may further comprise a suitable application 111 configured to be interfaced with the timing generator 113 and distance measurement/distance mapping unit 115. For example the application may be an automotive brake decision unit, automotive navigation unit, computer vision unit or otherwise. The application 111 may for example receive the distance map or distance values and perform a decision or determination to control further apparatus based on the distance information. In some further embodiments the application 111 may furthermore be configured to control the timing generator to change the distance measurement parameters.

In some embodiments the timing generator 113, distance measurement/mapping 115 and application 101 may be implemented within a computer (running suitable software stored on at least one memory and on at least one processor), a mobile device, or alternatively a specific device utilizing, for example, FPGAs (field programmable gate arrays) or ASICs (application specific integrated circuits).

Figure 2:
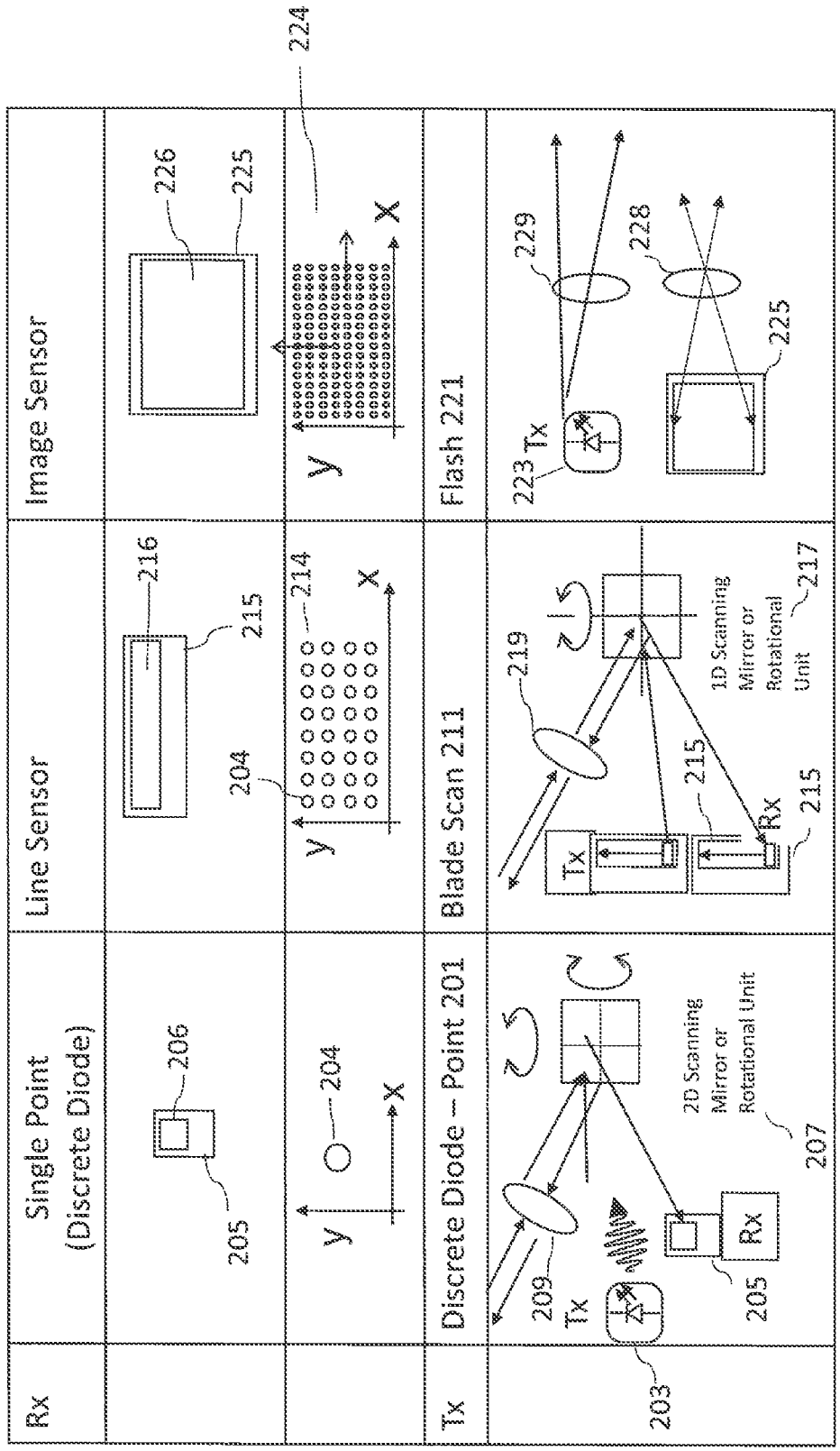
FIG. 2 shows a schematically LIDAR configurations such as single point, line sensor, and image sensor.

With respect to FIG. 2 example light source (transmitter) and detector (receiver) configurations are shown. A first example is a single-point or discrete diode configuration 201. The single-point configuration based system 201 comprises a transmitter 203 (for example a VCSEL or similar controllable light source) which is typically targeted using a 2D scanning mirror or the rotational unit 207 and output via optical element 209. The optical element 209 is further configured to receive the reflected light and focus it back via the 2D scanning mirror or the rotational unit 207 to a single point receiver 205. This single point receiver 205 typically comprises at least one photosensitive region (for example a SPAD 206) configured to detect the light and then generate suitable electronic pulses based on receiving the reflected light. By changing the direction of the 2D scanning mirror or rotational unit 207 an area can be scanned point by point.

A second example configuration is a line sensor/blade scan configuration 211. The blade scan configuration 211 typically comprises a (linear) array of transmitting elements, for example an array of VCSELs or other controllable light source elements. The light from the transmitting elements are then passed to a 1D scanning mirror or rotational unit 217 which then outputs via a suitable optical element 219. The optical element receives the reflected light and passes the reflected light via to the 1D mirror or rotational unit 217 to the receiver 215. The receiver 215 typically comprises an array of SPAD elements (for example a linear array of SPAD elements) or a linear photosensitive array. In such a manner a 'blade' or line of light may be generated and then received generating an image line. These lines may then be stepped by changing the direction of the 1D scanning mirror or rotational unit 217 to scan an area 218 (line 214 by line). In some embodiments the blade scan configuration 211 may be implemented by series of offset linear arrays or transmitting elements and a static mirror.

A third type of operation is a flash configuration wherein the transmitter (which may comprise one or more light sources) generates a single flash which may be output via a suitable optical element (or in some situations an optical window) 229 and the received light received via a further optical element 228 (or the same optical element 229 as the transmission path) at an image sensor 225 comprising an array of sensitive areas 226. The flash configuration thus is able to generate a single image 224 generated by a single exposure.

The differences between the configurations shown with respect to FIG. 2 are such the flash configuration although able to generate a fast frame rate but is limited in terms of accuracy because of safety light level limits and that the single point and line sensor configurations are limited in frame rate because of scanning but are able to use higher light levels and therefore produce more accurate image depth maps. Many applications, such as automotive navigation and automatic object detection, would benefit from a high frame rate and accurate depth map configuration as would be produced by embodiments as discussed hereafter.

Figure 3:
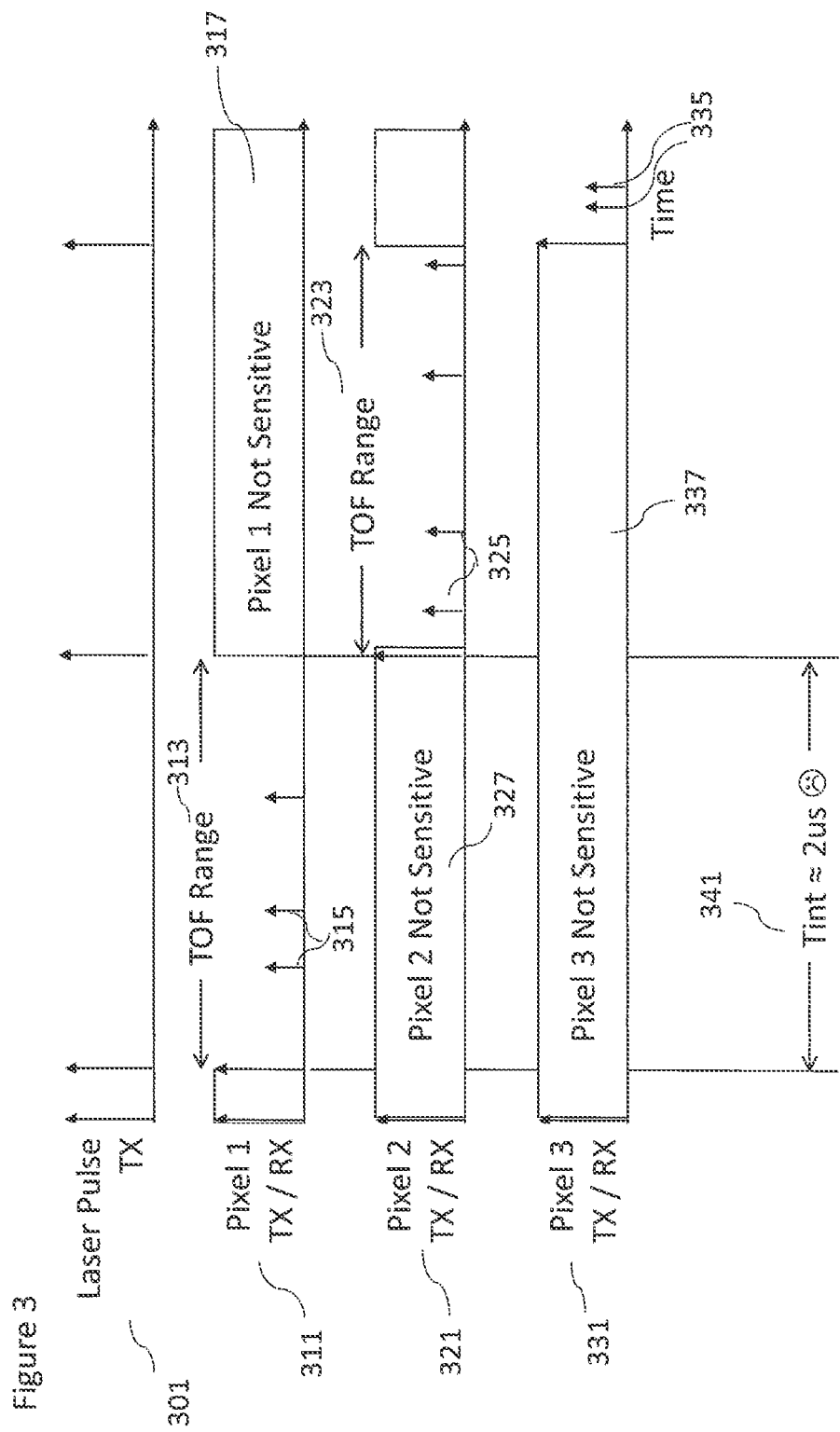
FIG. 3 shows example single dot-single point timing diagrams suitable for controlling laser pulses and pixel pairs.

One of the aspects which slow the frame rate of a single dot/single point configuration is the manner in which light source/pixels are individually activated. A typical time pattern for operating the pixels is shown in FIG. 3. FIG. 3 for example shows timing graphs showing the activation of the laser pulse or transmitter 301 which generates light pulses 302, 304, 306 which are separated by an integration time period $T_{int}$ 341. The integration time defines the expected maximum range of the system, in other words the expected maximum time for a light pulse to travel the distance from the transmitter to the target and reflected from the target back to the receiver.

FIG. 3 furthermore shows timing graphs for a series of pixels 311, 321, 331 in which the photosensitive regions are sequentially activated for an integration time.

The first pixel 311 is therefore shown being activated for a TOF range time 313 following a laser pulse 302 and then deactivated or in a not-sensitive time 317 for a series of following integration time periods. Within the TOF range time period 313 the reflected light may be detected as indicated by the event detection arrows 315. Furthermore during this period 313 pixel 2 321 and pixel 3 331 are not sensitive.

The second pixel 321 is shown being activated for a TOF range time 323 which immediately follows the second laser pulse 304 and also follows the end of the first pixel 311 TOF range time 313. Within this TOF range time 323 is shown detected events 325. The second pixel is shown being deactivated or in a not-sensitive time 327 which is the same period as the first pixel 311 TOF range time 313 and in the period after the TOF range time 323.

The third pixel 331 is shown being activated for a TOF range time 333 which immediately follows the third laser pulse 306 and also follows the end of the first pixel 311 TOF range time 313 and the second pixel 323 TOF range time 323. Within this TOF range time 333 is shown detected events 335. The second pixel is shown being deactivated or in a not-sensitive time 337 which is the same period as the first pixel 311 TOF range time 313 and the second pixel 321 TOF range time 323.

As shown therefore each pixel is activated sequentially and requires a separate Tint period 341 (typically in the order of 2 µs).

Figure 4:
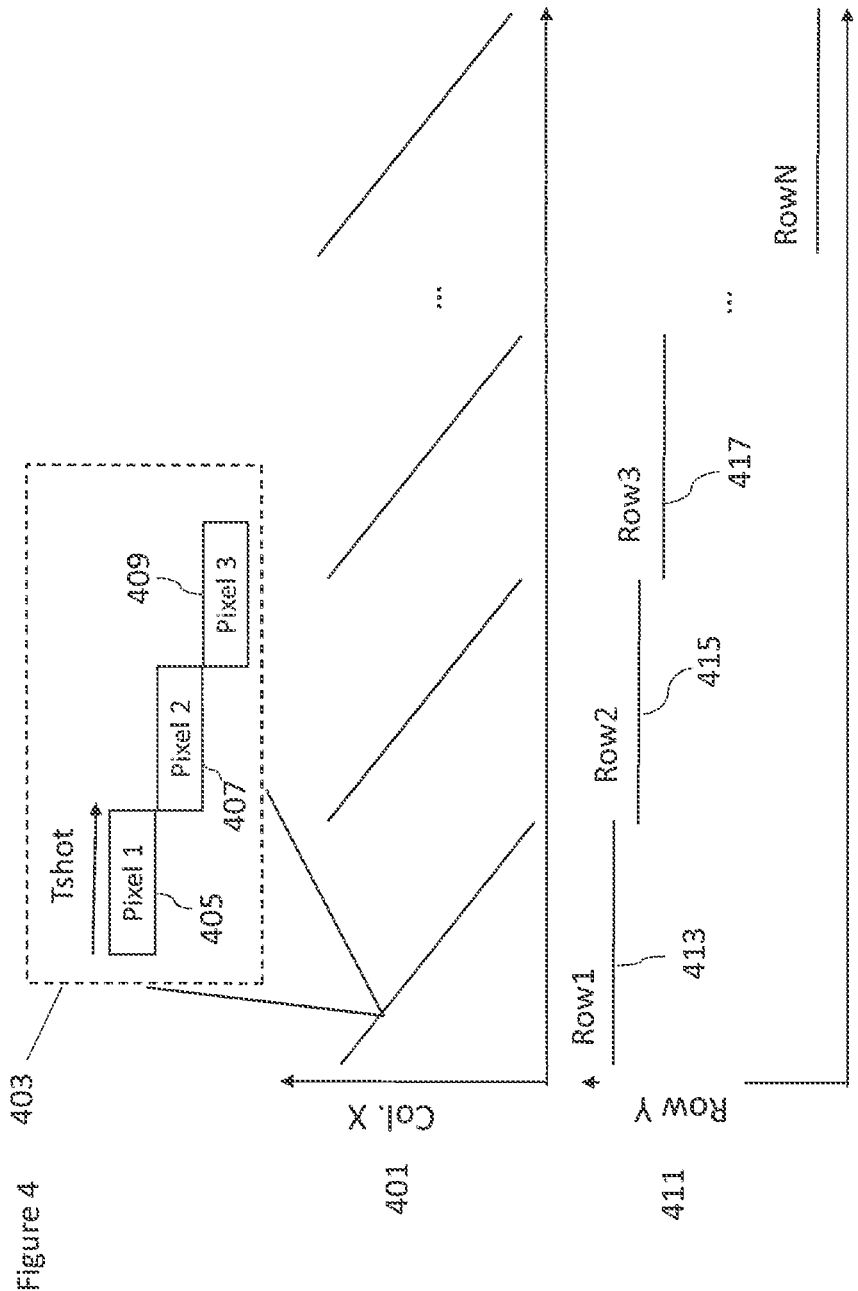
FIG. 4 shows example column and row timing diagrams based on the single dot-single point timing diagrams shown in FIG. 3.

This is then shown replicated in the scanning timing diagram of FIG. 4 which shows the column and row activations where each column 401 (or pixel) is activated sequentially for a separate Tint or Tshot time, as shown in close up view 403 of the sequential activation of pixel 1 405 pixel 2 407 and pixel 3 409, for a first Row, Row 1 413. The same sequential column activation for succeeding rows, Row 2 415, Row 3 417 to Row N is then shown.

Thus in such a system the frame period is limited by the Tshot or Tint time period.

The following examples therefore show embodiments wherein the frame period is not limited by the Tshot or Tint time period. The concept as discussed earlier is one in which the timing ranges for the pixels are configured to be at least partially overlapping. This may be implemented for example by the use of a staggered offset or staggered dot timing system wherein rather than activating pixels independently and sequentially the pixels are activated according to a staggered offset pattern per channel.

Figure 5:
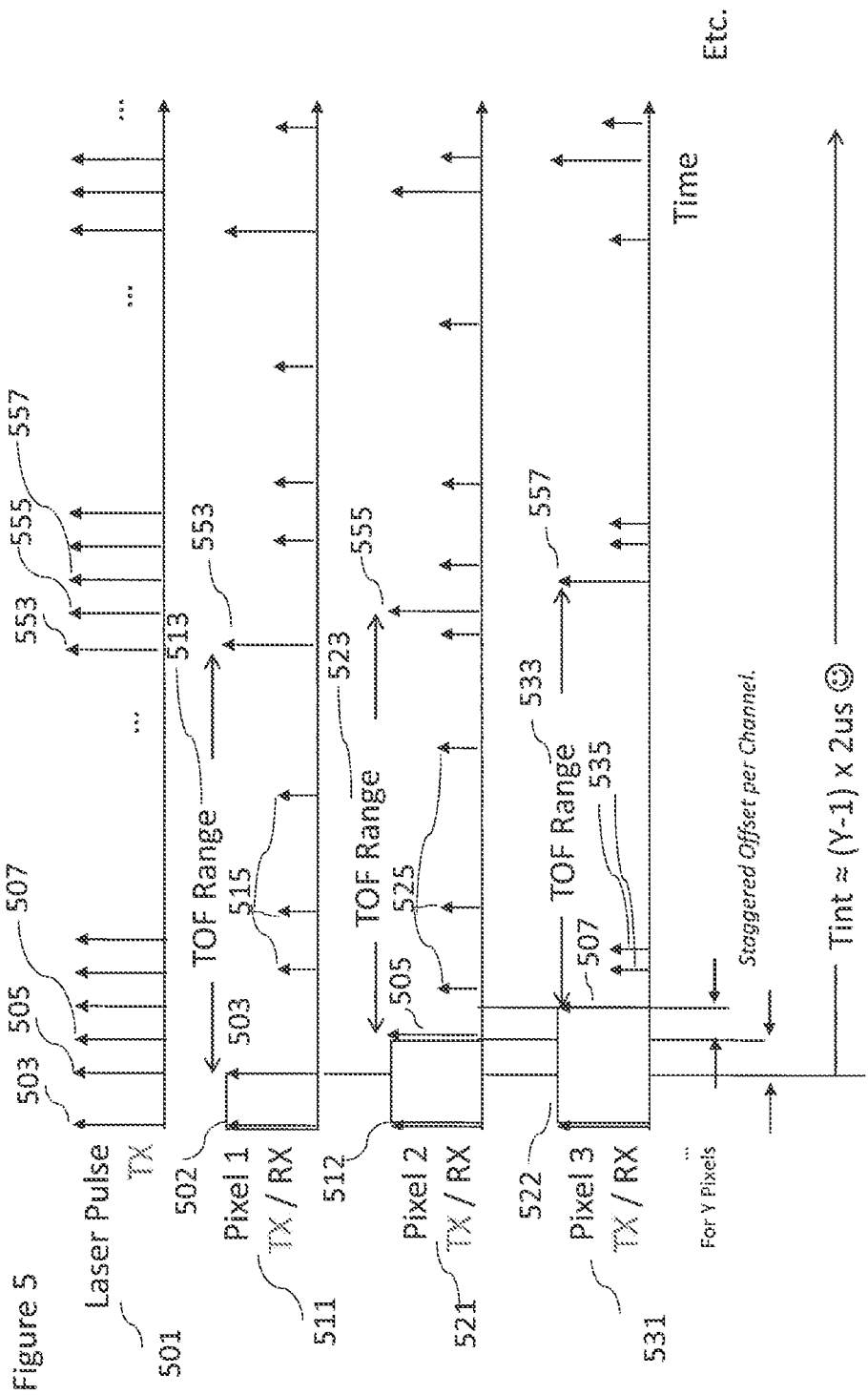
FIG. 5 shows an example staggered dot timing diagram according to some embodiments.

With respect to FIG. 5 an example staggered dot timing system is as used in some embodiments is shown in further detail. In this example the laser pulse timing 501 shows a sequence of pulses 503, 505, 507 where each successive pulse is associated with a pixel but is spaced according to a staggered offset period.

Thus the system shows a first laser pulse 503 associated with a first pixel, pixel 1, a second laser pulse 505 associated with a second pixel, pixel 2, a third laser pulse 507 associated with a third pixel, pixel 3 and so on to a Y'th laser pulse associated with a Y'th pixel. The system then repeats such that there is furthermore a further cycle first laser pulse 553 associated with the first pixel, pixel 1, a further cycle second laser pulse 555 associated with the second pixel, pixel 2, a further cycle third laser pulse 557 associated with the third pixel, pixel 3 and so on to a further cycle Y'th laser pulse associated with the Y'th pixel. This can be repeated for the desired number of ranging cycles.

The first pixel, pixel 1, as shown by timing line 511, may be configured such that it is active following the first laser pulse 503. Within this active time any return events 515 associated with the first laser pulse 503 can be detected within the TOF range 513 which continues up to the further cycle first laser pulse 553 which starts a further TOF range period until a determined number of ranging cycles is completed.

Furthermore for the second pixel, pixel 2, as shown by timing line 521, may be configured such that it is active following the second laser pulse 505. Within this active time any return events 525 associated with the second laser pulse 505 can be detected within the TOF range 523 which continues up to the further cycle second laser pulse 555 which starts a further TOF range period until a determined number of ranging cycles is completed. In some embodiments the second pixel is deactivated (shown by the cross hatched area 512) until the second laser pulse occurs.

For the third pixel, pixel 3, as shown by timing line 531, may be configured such that it is active following the third laser pulse 507. Within this active time any return events 535 associated with the third laser pulse 505 can be detected within the TOF range 533 which continues up to the further cycle third laser pulse 557 which starts a further TOF range period until a determined number of ranging cycles is completed. In some embodiments the third pixel is deactivated (shown by the cross hatched area 522) until the third laser pulse occurs.

In implementing the timing of the laser (light source) pulses such embodiments may be able to implement an integration time (Tint) for Y pulses in the region of (Y−1)× (time of light range period) (which may be approximately 2 µs).

Figure 6:
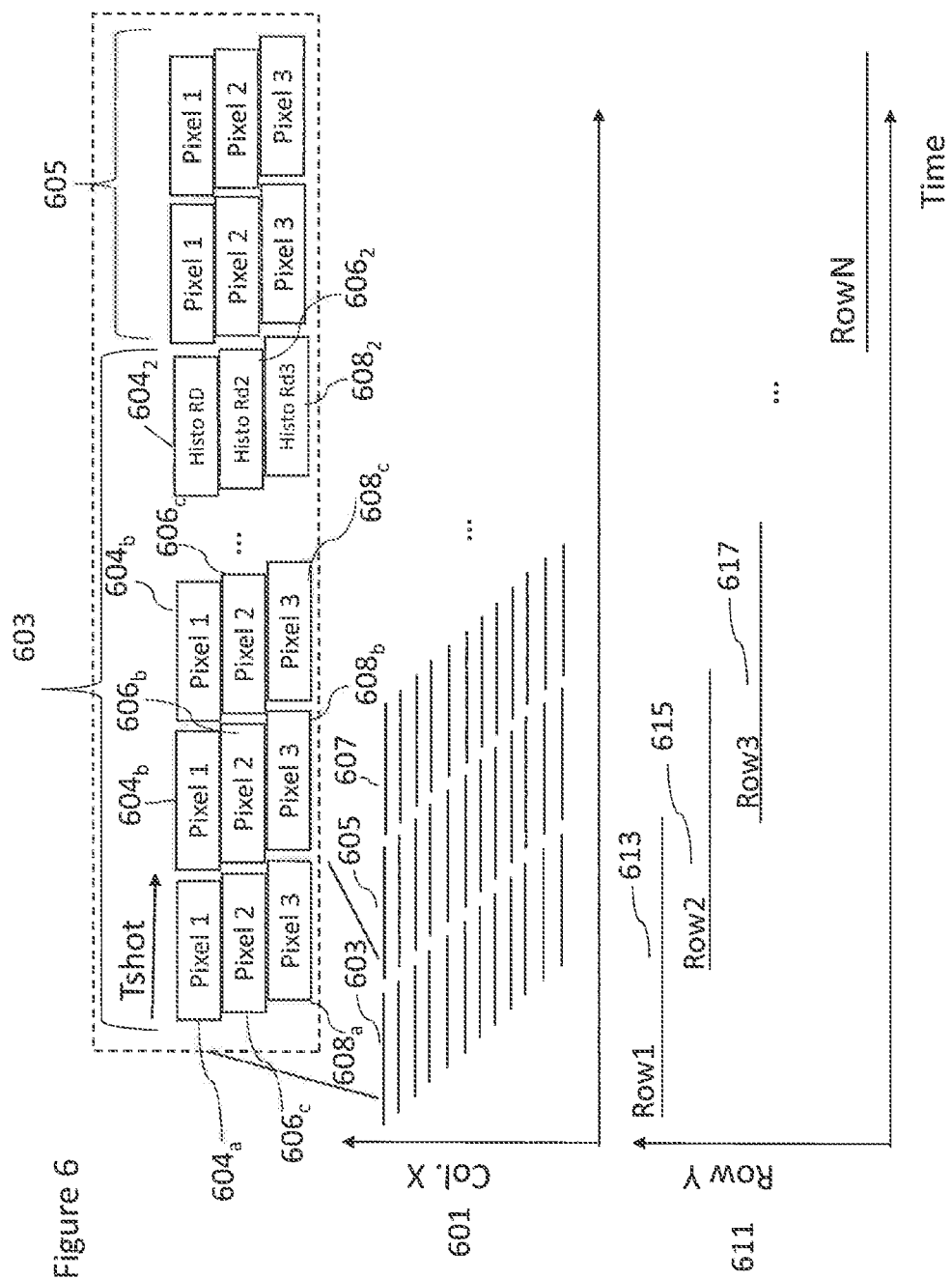
FIG. 6 shows an example column and row timing diagrams based on the staggered dot timing diagram shown in FIG. 5.

With respect to FIG. 6 is shown the row 611 and column 601 address timing aspects with respect to the staggered dot timing as shown in FIG. 5. In this example, with respect to the first row 613, there is shown a first sequence 603 of staggered pixel activation wherein each pixel is sampled for a number of times and then the histogram read out. For example as shown in FIG. 6 by the dashed box pixel 1 is sampled 604a, 604b, 604c, and then read out 6042. A stagger period after each pixel 1, pixel 2 is sampled 606a, 606b, 606c, and then read out 6062. A further stagger period after which pixel 3 is sampled 608a, 608b, 608c, and then read out 6082.

Additionally as soon as the row 1 pixel 1 histogram is read out the next row, row 2 615 can be activated and pixel 1 may be sampled, row 2 pixel 2 can then be activated a stagger delay after this and so on.

In such a manner row 2 615 can be active while row 1 613 is active (as shown in FIG. 6 by the overlapping periods of 613 and 615).

Figure 7:
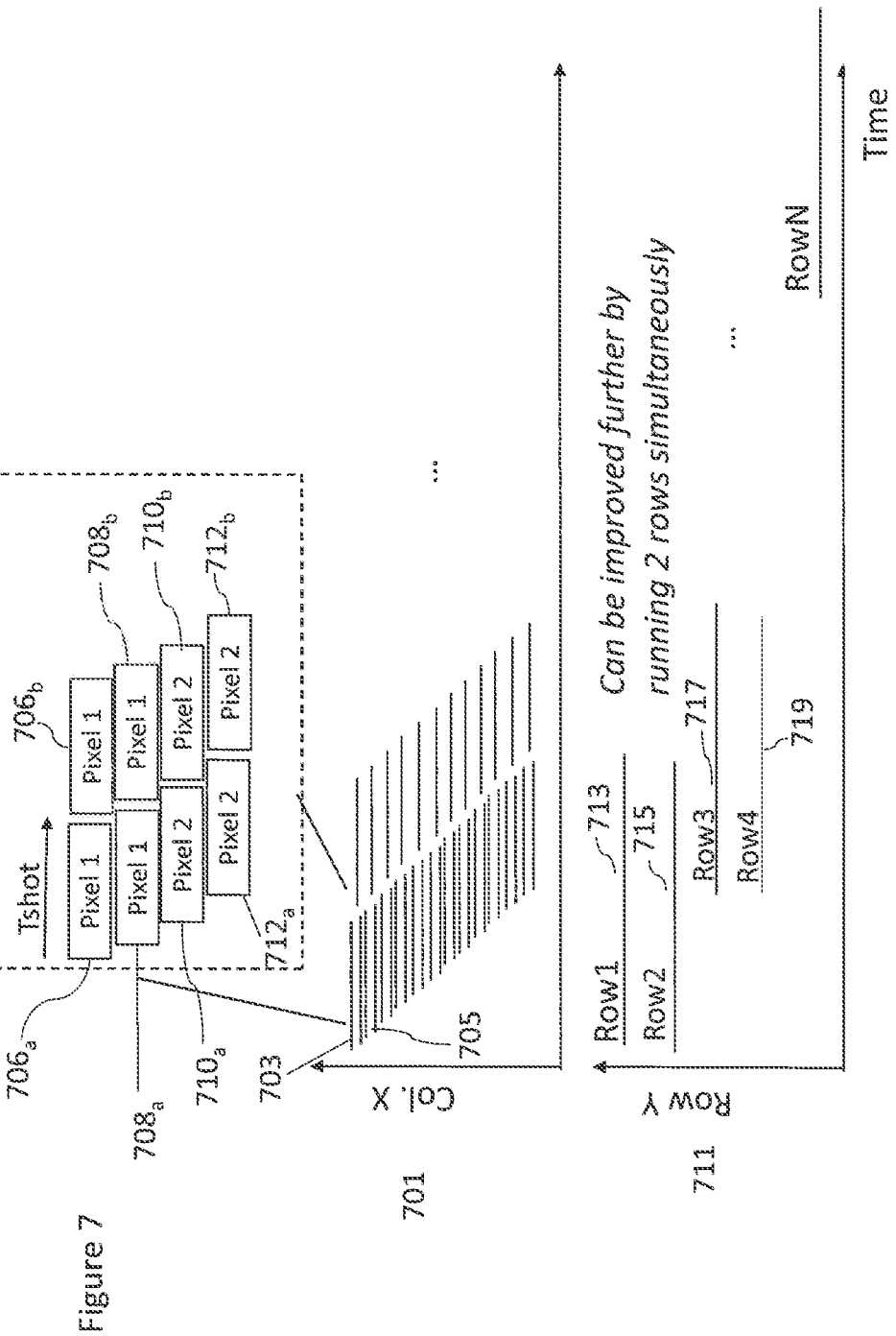
FIG. 7 shows a further example column and row timing diagrams based on the staggered dot timing diagram shown in FIG. 5 wherein 2 rows are operated simultaneously.

In some embodiments where there is no possibility of overlap between rows then rows can be run substantially simultaneously (with a stagger delay between them). For example in the example shown in FIG. 7 a paring of row 1 713 and row 2 715 are activated substantially simultaneously, where the row 1 pixel 1 is activated as shown by the sequence 706a, 706b followed after a stagger delay by a row 2 pixel 1 sequence 708a, 708b. This in turn may be followed, a stagger delay further after by row 1 pixel 2 sequence 710a, 710b followed after a stagger delay by row 2 pixel 2 sequence 712a, 712b.

As soon as the row 1 pixel 1 histogram is read out then in a manner similar to FIG. 6 then row 3 717 starts with pixel 1, followed a stagger delay later by row 4 719 with pixel 1.

Figure 8:
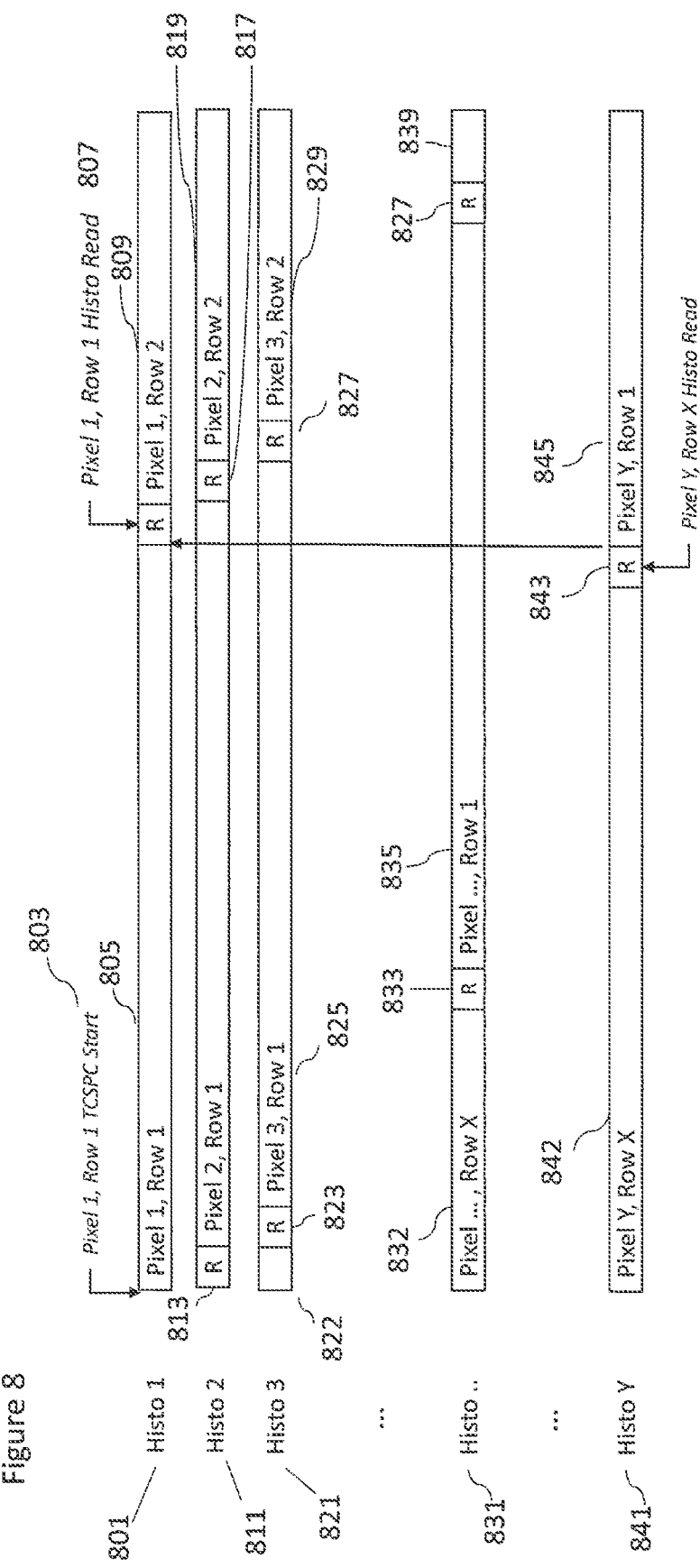
FIG. 8 shows an example timing operation of the detector using the timing diagrams shown in FIGS. 5 and 6 according to some embodiments.

In such a manner the frame rate can be further improved as also shown in FIG. 8 which shows a series of histograms timing outputs. A first timing line 801 is shown which starts 803 at the start of the pixel 1 row 1 histogram generation period 805. At the end of the pixel 1 row 1 histogram generation (in other words after a defined number of ranging cycles using the pixel 1 from row 1) then the pixel 1 row 1 histogram read 807 occurs. After this the pixel 1 row 2 histogram generation period 809 is started.

FIG. 8 furthermore shows a second timing line 811 which at the start 803 time is performing a pixel 2 row X (where X is the number of rows) histogram read 813 occurs. After this histogram read (the equivalent to a stagger delay) is the pixel 2 row 1 histogram generation period 815. At the end of the pixel 2 row 1 histogram generation (in other words after a defined number of ranging cycles using the pixel 2 from row 1) then the pixel 2 row 1 histogram read 817 occurs. After this the pixel 2 row 2 histogram generation period 819 is started.

This may be repeated for further histograms, so as shown in FIG. 8 there is a third timing line 821 which at the start 803 time is at the end of performing a pixel 3 row X histogram generation 822 and the pixel 3 row X histogram read 823 occurs. After this histogram read is the pixel 3 row 1 histogram generation period 825. At the end of the pixel 3 row 1 histogram generation (in other words after a defined number of ranging cycles using the pixel 3 from row 1) then the pixel 3 row 1 histogram read 827 occurs. After this the pixel 3 row 2 histogram generation period 829 is started.

A further histogram line 831 is shown which shows at the start 803 time is at the a pixel . . . row X histogram generation 832 and the pixel . . . row X histogram read 833 occurs. After this histogram read is the pixel . . . row 1 histogram generation period 835. At the end of the pixel . . . row 1 histogram generation (in other words after a defined number of ranging cycles using the pixel . . . from row 1) then the pixel . . . row 1 histogram read 837 occurs. After this the pixel . . . row 2 histogram generation period 839 is started.

A final histogram line 841 is shown which starts 803 at the start of the pixel Y row X histogram generation period 842. At the end of the pixel Y row X histogram generation (in other words after a defined number of ranging cycles using the pixel Y from row X) then the pixel Y row X histogram read 843 occurs. After this the pixel Y row 1 histogram generation period 845 is started.

Figure 9:
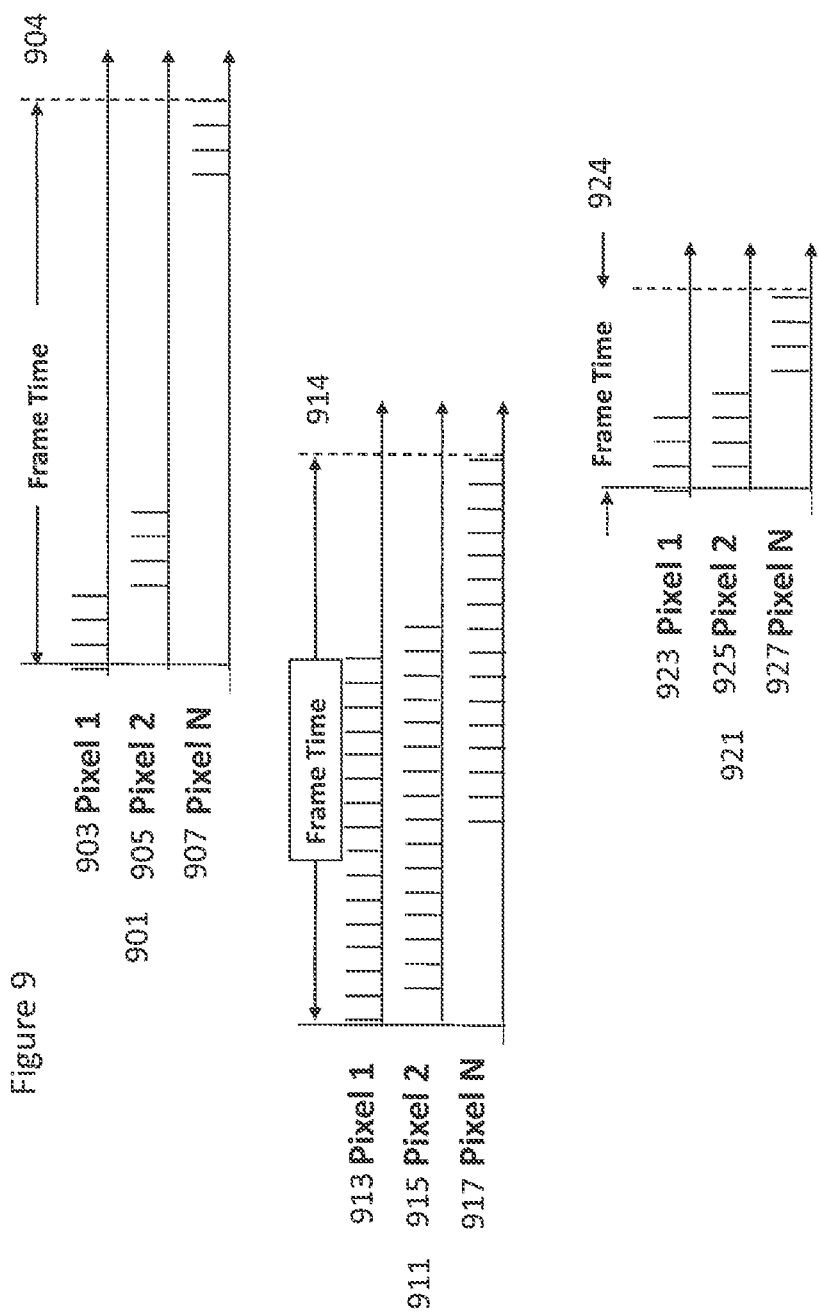
FIG. 9 shows example improvements with regards to higher signal to noise ratio or higher frame rate outputs using embodiments as shown in FIGS. 5 to 8.

With respect to FIG. 9 the advantages of using the stagger delay approach as described herein is shown. The upper part 901 of FIG. 9 shows a situation wherein each pixel is activated one after another. Thus a histogram associated with pixel 1 is generated 903 using a number (in this example situation 4) of samples before moving to pixel 2 905 and moving on until the last pixel, pixel N, 907. After all of the pixels are used then the frame is completed as shown by the frame time 904.

The middle part 911 of FIG. 9 shows a situation wherein a stagger delay is used between activating each pixel and that for the same frame time a signal to noise ratio can be improved as more samples can be used for each pixel. Thus the sampling of the histogram associated with pixel 1 is started 913 using a number (in this example situation 16) of samples. A stagger delay period after pixel 1 is started then pixel 2 915 is started and so on until the last pixel, pixel N, 917 is started. After all of the pixels are finished then the frame is completed as shown by the frame time 914.

The lower part 921 of FIG. 9 shows a situation wherein a stagger delay is used between activating each pixel and that for the same number of samples as shown in the upper part 901 the pixels may be sampled using a shorter frame time 924.

Thus the sampling of the histogram associated with pixel 1 is started 923 using a number (in this example situation 4) of samples. A stagger delay period after pixel 1 is started then pixel 2 925 is started and so on until the last pixel, pixel N, 927 is started. After all of the pixels are finished then the frame is completed as shown by the frame time 924 where the frame time 924 is shorter than the frame time 904.

In some embodiments a spatial dithering/randomization may be employed to switch from pixel to pixel in order in order to allow a higher power per point and longer integration per receive pixel as spatial dithering/randomization moves the light out of the eye field of view.

Figure 10:
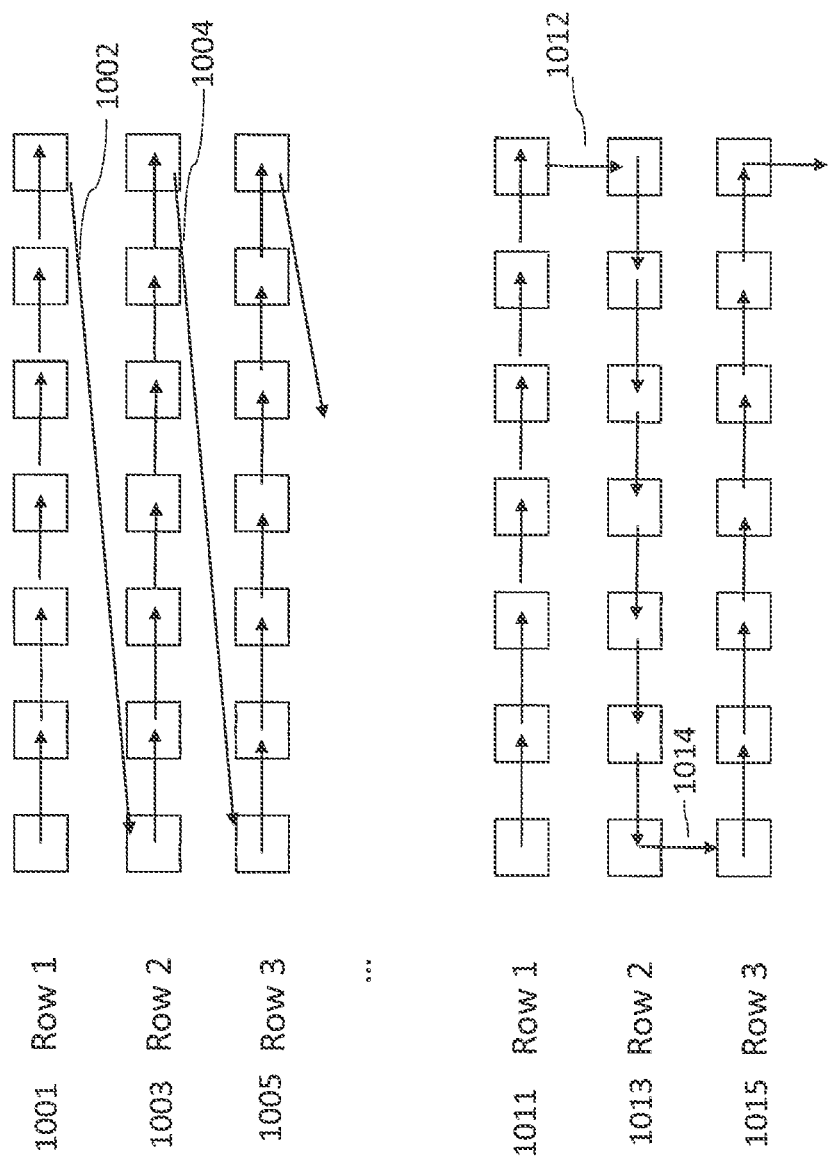
FIG. 10 shows example raster patterns for reading SPADs based on the timing diagrams of FIGS. 3 and 4.

Some patterns associated with moving from pixel to pixel using the stagger delay operation is shown furthermore with example and with respect to FIG. 10. The upper part of FIG. 10 shows a first example raster pattern for operating a pixel-by-pixel scan. This is a conventional single dot raster pattern where the first row, row 1, 1001 is scanned from one side to the other, a scan line return 1002 is implemented before a second row, row 2 1003, is scanned, a further scan line return 1004 is implemented a third row, row 3 1005, is scanned and so on. This may be applied to the stagger delay operations described herein wherein each pixel scan starts a stagger delay after each other.

The lower part of FIG. 10 shows a second example raster pattern for operating a pixel-by-pixel scan. This is a snake single dot raster pattern where the first row, row 1, 1011 is scanned from one side to the other, a scan line jump 1012 is implemented before the second row, row 2 1013, is scanned in the opposite direction to the first row. After a further scan line jump 1014 is implemented a third row, row 3 1005, is scanned in the opposite direction to the second row (and the same direction as the first row and the pattern repeats. This also may be applied to the stagger delay operations described herein wherein each pixel scan starts a stagger delay after each other.

Figure 11:
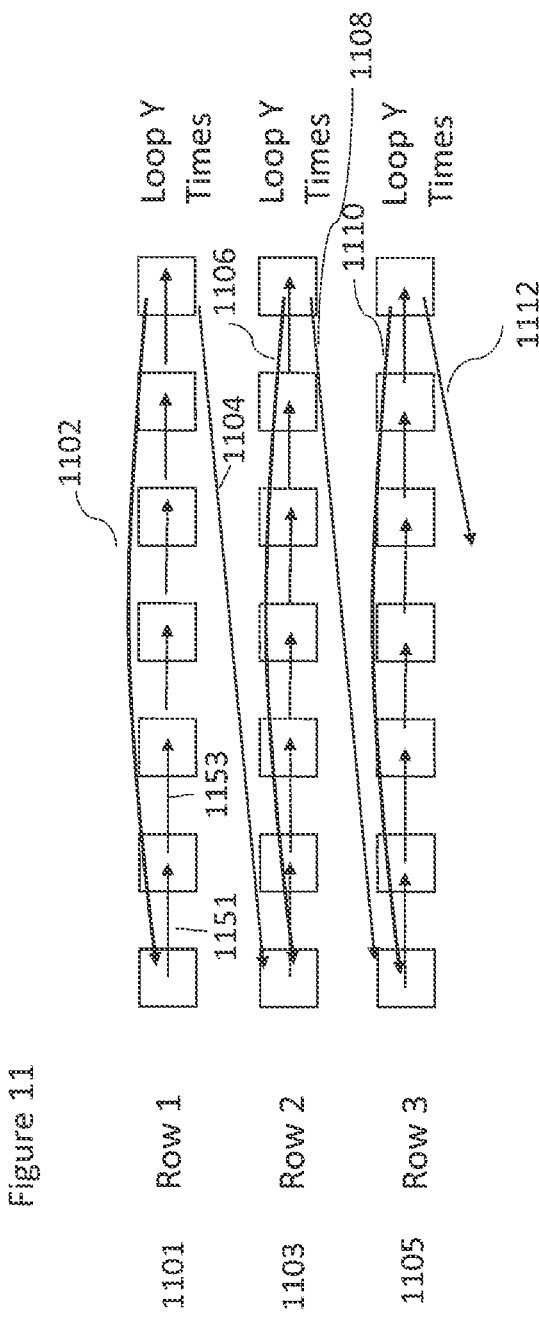

FIG. 11 shows a third example which is a modified raster pattern for operating a pixel-by-pixel scan using a stagger delay in a manner described herein. In this scan pattern the first row, row 1, 1101 is scanned from one side to the other and the looped back Y times 1102. After the Y'th loop is completed, a scan line return 1104 is implemented before a second row, row 2 1103, is scanned in the same direction as row 1.

Row 2 1103 is looped Y times 1106 and after the Y'th loop is completed, a scan line return 1108 is implemented before a third row, row 3 1105, is scanned in the same direction as row 2.

Row 3 1105 is looped Y times 1110 and after the Y'th loop is completed, a scan line return 1112 is implemented for the next row scan and so on.

The patterns shown in FIGS. 10 and 11 have equal spatial-temporal sampling per pixel.

Figure 12:
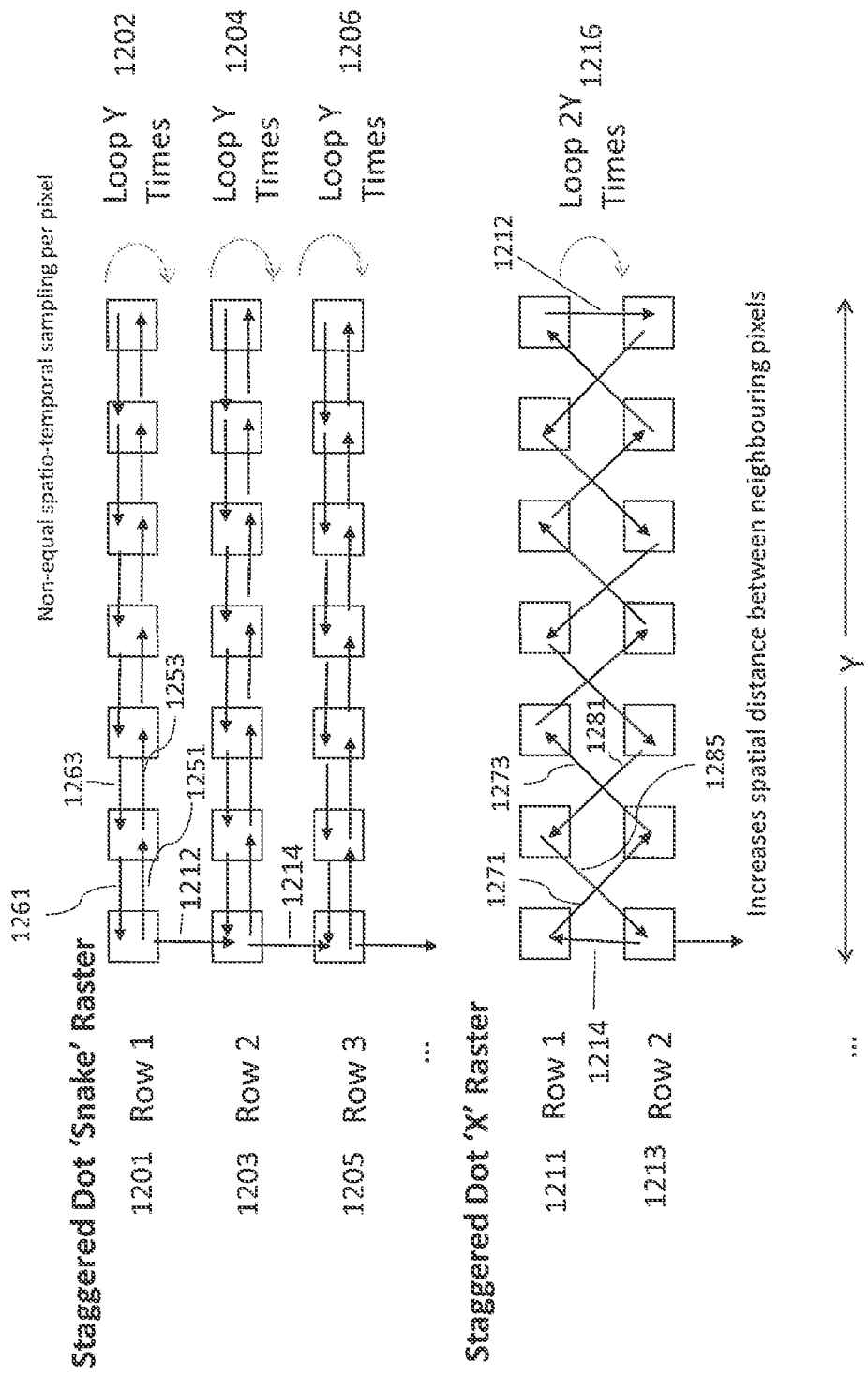

FIG. 12 shows two further patterns. The upper part of FIG. 12 shows a fourth example which is a modified snake raster pattern for operating a pixel-by-pixel scan using a stagger delay in a manner described herein. In this scan pattern the first row, row 1, 1201 is first scanned from one side to the other 1251 and then scanned from the other side back to the start 1253. After this the cycle is looped Y times 1202. After the Y'th loop is completed, a scan line return 1212 is implemented.

This cycle is repeated for a second row, row 2 1203, is scanned in the same manner as row 1 (in other words in a first direction and then back again and then repeated for Y times 1204 before then implementing a scan line return 1214).

This is again repeated for a third row, row 3 1205, and further rows.

The lower part of FIG. 12 shows a fifth example which is a modified X raster pattern for operating a pixel-by-pixel scan using a stagger delay in a manner described herein. In this scan pattern pairs of rows are grouped and the scan is organized such that the first row, row 1, 1211 pixel 1 is first scanned, then the second row, row 2, 1213 second pixel is scanned, and a spatial X pattern followed to the end of the scan line ending at the row 1 end pixel and then started again from the row 2 end pixel back to row 2 first pixel. This may then be looped 2Y times 1216.

After the last loop has been completed then the next pair of rows is scanned in the same manner.

This raster pattern attempts to increase the spatial distance between neighboring pixels.

In some embodiments the pattern may be formed from groups of more than two rows.

The pattern shown in FIG. 13 shows a sixth example which is a skip pattern. In this scan pattern the first row, row 1, 1301 is first scanned from one side to the other 1351 wherein in the scan a skip is performed missing a pixel for each skip. At reaching the end the row is then scanned from the other side back to the start performing a similar skip pattern. When this reaches the beginning of the row this the cycle is looped Y times 1312. After the Y'th loop is completed, a scan line return 1302 is implemented.

This cycle is repeated for a second row, row 2 1303, is scanned in the same manner as row 1 (and then repeated for Y times 1314 before then implementing a scan line return 1304).

This is again repeated for a third row, row 3 1305, and further rows.

This approach similarly increases the spatial distance between neighboring pixels.

Although a skip 1 pattern is shown other skip patterns may be implemented.

The above examples show various spatial patterns, however any suitable spatial pattern can be implemented where the spatial pattern may be deterministic, pseudo-random or random.

The apparatus and method described above may be implemented in any device or apparatus which utilizes single photon avalanche detectors. For example, the apparatus and method described above may be implemented in a LIDAR system. It should be understood that this non-limiting implementation is only exemplary, and the apparatus and method may be implemented in any manner of other light-detecting applications.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

What is claimed is:

1. An apparatus for controlling pixel scanning within a range detector, the apparatus comprising:
  a single-point diode light source configured to provide spatially controllable point light pulses;
  a detector comprising a light sensor configured to receive reflected spatially controllable point light pulses;
  a controller configured to control the single-point diode light source, wherein the controller is configured to:
    control the single-point diode light source to generate a first series of light source pulses during a first time period, the first series of light source pulses associated with a first spatial direction; and
    control the single-point diode light source to generate a second series of light source pulses during a second time period that begins after the first time period begins, the second series of light source pulses associated with a second spatial direction, wherein the first and second time periods overlap so that the second series of light source pulses are started during the first series of light source pulses.

2. The apparatus as claimed in claim 1, wherein the first series of light source pulses are associated with a first row of light sensor elements and the second series of light source pulses are associated with a second row of light sensor elements.

3. The apparatus as claimed in claim 2, wherein the first series of light source pulses are associated with a first row first light sensor element of the first row of light sensor elements and the second series of light source pulses are associated with a second row first light sensor element of the second row of light sensor elements.

4. The apparatus as claimed in claim 2, wherein the controller is further configured to control the single-point diode light source to generate a third series of light source pulses associated with a third spatial direction, the third spatial direction are associated with a third row of light sensor elements, wherein the third series of light source pulses are generated during a time period that is substantially simultaneous with the first time period.

5. The apparatus as claimed in claim 1, wherein the controller is configured to spatially dither the single-point diode light source.

6. The apparatus as claimed in claim 1, wherein the controller is configured to randomly select a spatial direction for the first and second series of light source pulses.

7. The apparatus as claimed in claim 1, wherein the controller is configured to control the single-point diode light source to form a z-raster pattern with the first series of light source pulses.

8. The apparatus as claimed in claim 1, wherein the controller is configured to control the single-point diode light source to form a snake-raster pattern with the first series of light source pulses.

9. The apparatus as claimed in claim 1, wherein the controller is configured to control the single-point diode light source to form a x-raster pattern with the first series of light source pulses.

10. The apparatus as claimed in claim 1, wherein the controller is configured to control the single-point diode light source to form a random or pseudo-random pattern with the first series of light source pulses.

11. The apparatus as claimed in claim 1, wherein the controller is configured to control the single-point diode light source to form a skip-n raster pattern with the first series of light source pulses.

12. A method for controlling pixel scanning within a range detector, the method comprising:
   using a spatially controllable single-point diode light source to generate a first series of light source pulses associated with a first spatial direction, wherein the first series of light source pulses are generated during a first time period; and
   using the spatially controllable single-point diode light source to generate a second series of light source pulses associated with a second spatial direction, wherein the second series of light source pulses are generated during a second time period that overlaps with the first time period so that the second series of light source pulses are started during the first series of light source pulses.

13. The method as claimed in claim 12, further comprising:
   receiving a reflected version of each of the light source pulses of the first series at a first row of elements of a light sensor; and
   receiving a reflected version of each of the light source pulses of the second series of light source pulses at a second row of elements of the light sensor.

14. The method as claimed in claim 13, wherein the first series of light source pulses are received by a first row first element of the light sensor and the second series of light sources pulses are associated with a second row first element of the light sensor.

15. The method as claimed in claim 13, further comprising generating a third series of light source pulses associated with a third spatial direction, wherein the third series of light source pulses are generated during a time period that is substantially simultaneous with the first time period and wherein the third series of light source pulses are received by a third row of elements of the light sensor.

16. The method as claimed in claim 12, wherein the spatially controllable single-point diode light source is controlled by spatially dithering the light source.

17. The method as claimed in claim 12, wherein the spatially controllable single-point diode light source is controlled by randomly selecting a spatial direction during for the first or second series of light source pulses.

18. The method as claimed in claim 12, wherein the spatially controllable single-point diode light source is controlled to form a z-raster pattern with the first series of light source pulses.

19. The method as claimed in claim 12, wherein the spatially controllable single-point diode light source is controlled to form a snake-raster pattern with the light source.

20. The method as claimed in claim 12, wherein the spatially controllable single-point diode light source wherein the spatially controllable single-point diode light source is controlled to form a x-raster pattern with the first series of light source pulses.

21. The method as claimed in claim 12, wherein the spatially controllable single-point diode light source is controlled to form a random or pseudo-random pattern with the first series of light source pulses.

22. The method as claimed in claim 12, wherein the spatially controllable single-point diode light source is controlled to form a skip n raster pattern with the first series of light source pulses.

23. A method for controlling pixel scanning within a range detector, the method comprising:
   generating, by a single-point diode light source, a first series of light source pulses associated with a first spatial direction, wherein the first series of light source pulses are generated during a first time period;
   generating, by the single-point diode light source, a second series of light source pulses associated with a second spatial direction, wherein the second series of light source pulses are generated during a second time period that overlaps with the first time period;
   generating, by the single-point diode light source, a third series of light source pulses associated with a third spatial direction, wherein the third series of light source pulses are generated during a time period that is substantially simultaneous with the first time period;
   receiving a reflected version of each of the light source pulses of the first series at a first row of elements of a light sensor;
   receiving a reflected version of each of the light source pulses of the second series at a second row of elements of the light sensor; and
   receiving a reflected version of each of the light source pulses of the third series at a third row of elements of the light sensor.

* * * * *